April 4, 1967   H. BLAZEK   3,311,987
PNEUMATIC ATTITUDE SENSOR
Filed May 19, 1965   2 Sheets-Sheet 1
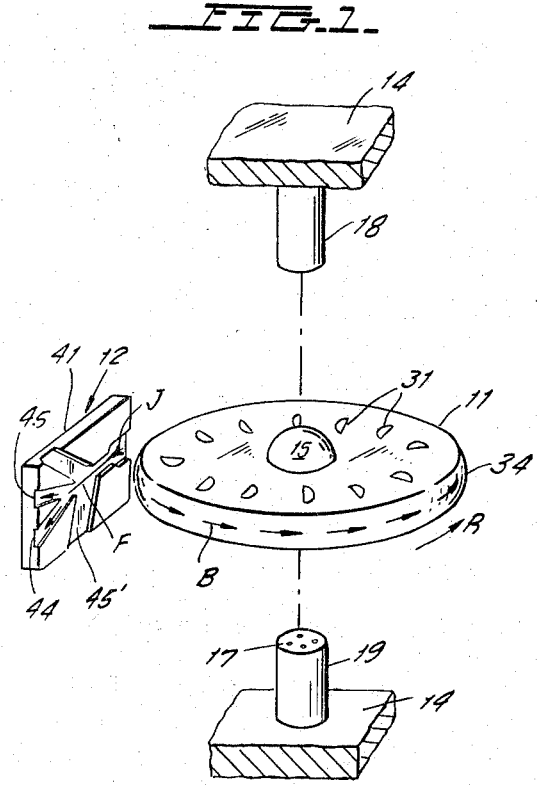
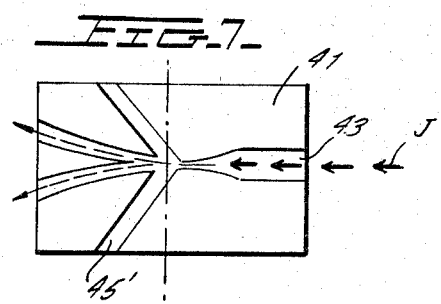
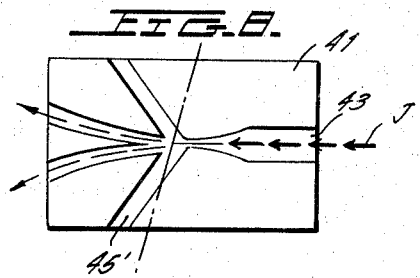
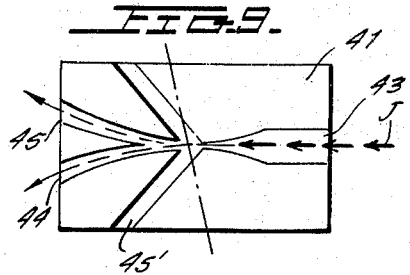
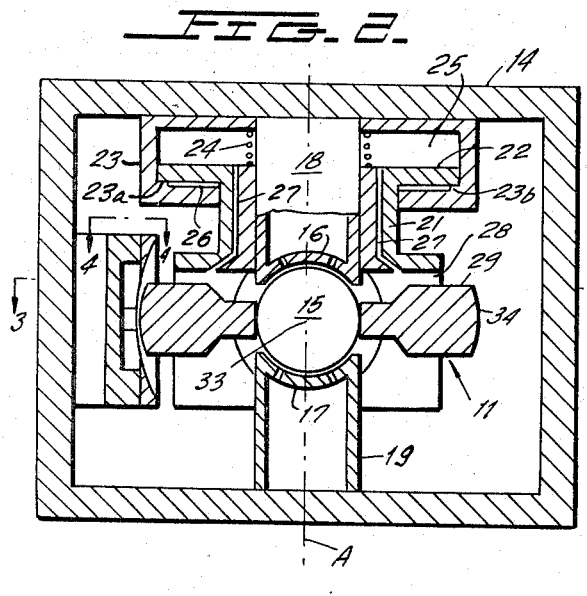
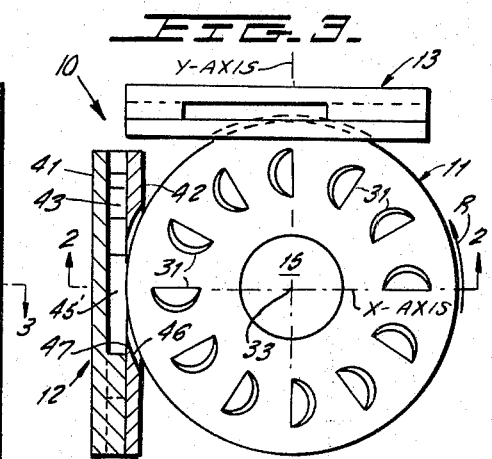
INVENTOR
HENRY BLAZEK
BY Raymond R. Skolnick

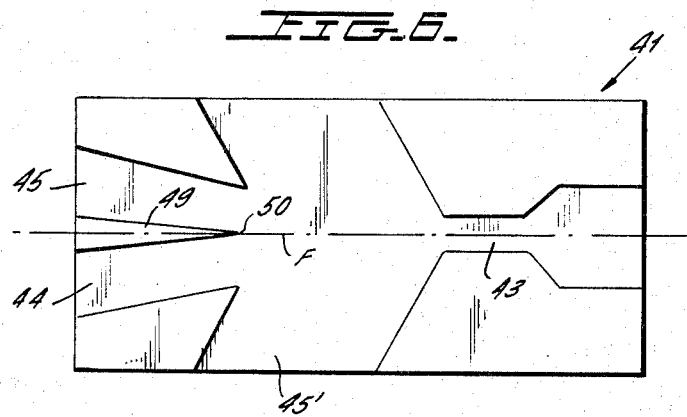
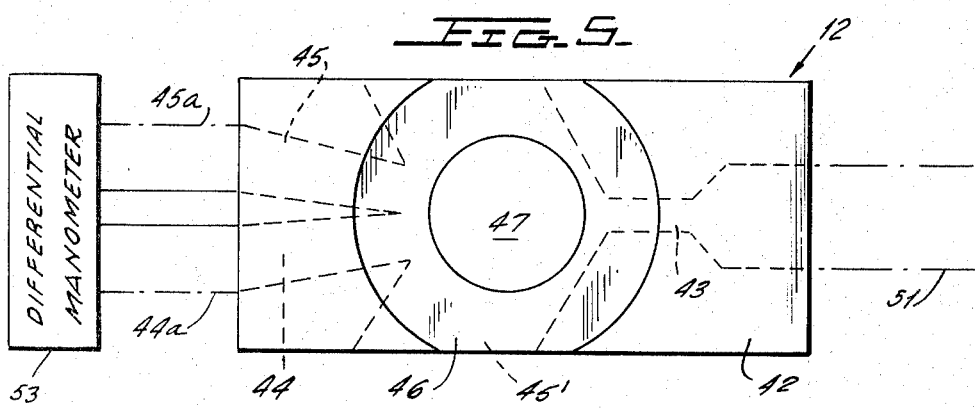
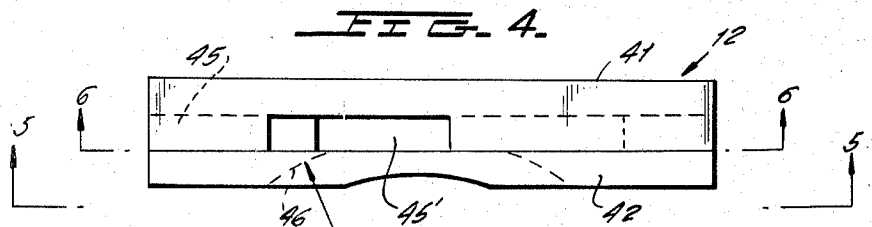

United States Patent Office 3,311,987
Patented Apr. 4, 1967

3,311,987
PNEUMATIC ATTITUDE SENSOR
Henry Blazek, Nyack, N.Y., assignor to Sperry Rand Corporation, Ford Instrument Company Division, a corporation of Delaware
Filed May 19, 1965, Ser. No. 456,946
20 Claims. (Cl. 33—204)

This invention relates to directional control gyros in general and more particularly relates to an attitude sensing means having a novel fluid operated angle transducer.

Conventional techniques for indicating the direction of the spin axis of a rotating wheel usually utilize a form of electrical transducer and provide an output in the form of a voltage. For some applications it is desirable to utilize standard type proportional fluid amplification systems for readout and/or control and in such cases it has been necessary to convert the voltage output into a pressure differential. By utilizing a fluid sensor the necessity of converting from an electrical output to a fluid output is eliminated.

One approach to an all pneumatic attitude sensor is to eliminate all moving parts. In such a system the static flow path of a fluid is disturbed by the rotational motion of the case containing fluid. However, it has been found that this type of approach results in major inaccuracies.

It has been found that by utilizing a spinning wheel gyroscopic approach, an accurate all pneumatic attitude sensor may be constructed. There are a number of ways to use fluid flow effects to detect the attitude of a spinning wheel with respect to its case. A major consideration is that the technique employed be such that excessive torques are not applied to the spinning wheel so as not to cause precession of the basic attitude reference.

One technique utilizing the spinning wheel gyroscopic approach in an all pneumatic attitude sensing system is to have the gyro wheel move relative to its case with the edge of the wheel partially closing an exhaust port which normally feeds gas into the case. This changes the relative flow between the exhaust port and a control port of a standard fluid amplifier. An improved technique of this type, forming the subject matter of the instant invention, utilizes deflection of a jet stream for attitude sensing.

That is, a jet stream flowing in near proximity to the peripheral edge of the rotating gyro wheel in a direction tangential to the edge, is deflected from its normal course when the wheel is displaced from its null orientation. With the wheel in a null orientation the jet stream is caused to divide into two equal parts with each part entering an individual diffuser with the diffuser outputs providing inputs for a differential manometer. The diffuser is a channel of expanding cross sectional area which is used to convert kinetic energy in the form of gas velocity to potential energy in the form of gas pressure. Tilting of the gyro wheel from its null orientation causes an interaction between the jet stream and a boundary layer of fluid moving with the gyro wheel edge. The result is a deflection of the jet toward one of the diffusers and away from the other diffuser such that more fluid enters the former, and less fluid enters the latter. The kinetic energy of the fluid entering the diffuser is converted into potential energy in the form of pressure with the result that the two diffusers have a differential pressure proportional to deflection of the gyro wheel. The differential pressures are converted by the manometer to an indication of attitude.

Accordingly, a primary object of the instant invention is to provide a novel attitude sensing means utilizing fluid flow techniques.

Another object is to provide a novel attitude sensing means utilizing a spinning wheel gyroscopic approach in combination with a fluid transducer to detect the attitude of the spinning wheel with respect to its case.

Still another object is to provide a novel attitude sensor whose output may be fed directly to a fluid amplification system without the necessity of converting an electrical signal to a pressure differential.

These as well as other objects of this invention will become readily apparent after reading the following description of the accompanying drawings in which:

FIGURE 1 is a schematic showing the broad principles of operation of a fluid attitude sensor constructed in accordance with the teachings of the instant invention.

FIGURE 2 is a cross section taken along lines 2—2 of FIGURE 3 looking in the direction of arrows 2—2 and illustrating a fluid attitude sensor constructed in accordance with the teachings of the instant invention. In FIGURE 2 the gyro wheel is shown rotating about the spin axis prior to retraction of the spin-up and caging mechanism.

FIGURE 3 is a plan view looking in the direction of arrows 3—3 of FIGURE 2 illustrating the relationship between the gyro wheel and the X and Y axes fluid angle transducers.

FIGURE 4 is a plan view of the X axis fluid angle transducer looking in the direction of arrows 4—4 of FIGURE 2.

FIGURE 5 is a side elevation of the transducer of FIGURE 4 looking in the direction of arrows 5—5 of FIGURE 4.

FIGURE 6 is a cross section taken through line 6—6 of FIGURE 4 looking in the direction of arrows 6—6.

FIGURES 7, 8 and 9 are views similar to FIGURE 6 with arrows superimposed to illustrate fluid flow for different positions of the gyro wheel spin axis.

Now referring to the figures. Attitude sensing device 10 consists of rotatable gyro wheel 11, axis attitude transducer 12 and Y axis attitude transducer 13 all disposed within frame or housing 14. Gyro wheel 11 is provided with a central aperture into which ball 15 is force fitted. Ball 15 is positioned between spherical air bearing pads 16, 17 positioned at the ends of aligned hollow posts 18, 19, respectively, extending inwardly from opposed walls of housing 14. Fluid under pressure introduced into posts 18, 19 and exhausted through apertures in pads 16, 17 provides a fluid bearing for wheel 11. Since spherical fluid bearing means of this type are now well known to the art and do not form a part of the instant invention, no further description thereof will be attempted.

A caging and spin-up mechanism mounted to post 18 is used to accelerate gyro wheel 11 to operational angular velocities and also provides repeatability and relatively "kick free" caging. Briefly, this mechanism consists of piston means 21 having a central bore which receives and is closely fitted to post 18 so that piston 21 is movable along the axis of post 18. Circular extension 22 at the upper end of piston 21 is disposed within cylinder 23. Compression spring 24 disposed within cylinder chamber 25 and surrounding post 18 urges piston 21 toward gyro wheel 11 with internal cylinder formations 23a, 23b limiting this movement so that there is always a chamber 26 on the side of piston extension 22 opposite chamber 25. Fluid passages 27 extend through piston 21 from chamber 25 to the piston surface 28 confronting rotor surface 29.

The caging and spin-up mechanism operates in the following manner. Initially piston 21 is in the position indicated in FIGURE 2 because of the action of return spring 24. Fluid under pressure is introduced into chambers 25 and 26 at the same time as fluid under pressure is introduced into posts 18 and 19. Since the pressures within chambers 25 and 26 are equal, piston 21 remains in the position shown. Fluid jet streams emitted through the exits of passages 27, disposed in a circular array about reference or spin axis A, impinge upon turbine buckets 31 cut in wheel surface 29 so that wheel 11 is accelerated to operational angular speeds about spin axis A. After a predetermined interval of time fluid pressure within chamber 25 is reduced to ambient while the pressure in chamber 26 is maintained. This pressure differential causes piston 21 to move away from wheel 11 to uncage wheel 11. As a result of inertia, after fluid pressure is removed from chamber 25 gyro wheel 11 continues to rotate for the required operational period. When the operational period is over fluid pressure within chamber 26 is reduced thereby permitting return spring 24 to return piston 21 to the caging position shown.

In the neutral or null position for gyro wheel 11, rotation thereof is centered with respect to a plate defined by X and Y measuring axes which are perpendicular to each other as well as perpendicular to spin axis A with all three axes intersecting at the center 33 of ball 15. The peripheral edge 34 of wheel 11 is spherically shaped about point 33 as a center and extends into depressions in X axis transducer 12 and Y axis transducer 13. Since these transducers are of identical constructions only the former will be described by particular reference to FIGURES 4 through 6.

Transducer 12 is constructed of two plate-like members 41, 42 abutting each other and secured together by suitable means, such as welding, with plate 41 positioned to the rear of plate 42. The surface of plate 41 confronting plate 42 is provided with cut out portions defining jet forming nozzle 43, diffusers 44, 45, and open region 45' between nozzle 43 and diffusers 44, 45. Diffusers 44, 45 are separated by formation 49, which, at the rear thereof, is in the shape of a knife edge 50 separating the entrances to diffusers 44, 45. The center line F (FIGURE 6) of nozzle 43 intersects knife edge 50. Thus, a fluid stream directed forward from nozzle 43 along center line F will be divided equally between diffusers 44, 45 by knife edge 50 so long as the fluid stream is centered with respect to line F at the time the stream meets knife edge 50. The surface of plate 42 remote from plate 41 is provided with spherical depression 46 formed about point 33 as a center with the bottom of depression 46 having a circular aperture 47 which communicates with open region 45'. It is noted that the X axis extends through the center of aperture 47 and that plates 41 and 42 are substantially perpendicular to the X axis.

During operation of transducer 12, fluid under pressure is introduced to an entrance of nozzle 43 by means of conduit 51. The converging shape of nozzle 43 causes the fluid to exit as a high velocity fluid stream or jet J (FIGURE 1). As jet stream J leaves nozzle 43 and enters open region 45' which is at ambient pressure, this stream becomes a free jet and although it diverges slightly as it travels through open region 45', jet J retains its character because of the high initial velocity and short distance of travel. As jet J strikes knife edge 50 the former is divided between diffusers 44, 45, the latter being shaped as diverging channels. In diffusers 44, 45 the velocity heads are reconverted to pressure head with the pressures being transmitted through conduits 44a, 45a, connected to diffusers 44, 45, respectively, to differential manometer 53 which serves as a readout device.

When jet J is centered with respect to center line F jet J is said to be on a null path. If jet J is on null path F at the time of impingement upon knife edge 50, jet J divides equally between the two diffusers 44, 45 so that the pressures within conduit 44a, 45a are equal and there is no pressure differential detected by differential manometer 53. When the jet is deflected away from null path F, for example, above path F, flow into diffuser 45 will increase while flow into diffusers 44 will decrease. This creates a pressure differential fed to differential manometer 53. The converse is true if the jet is deflected downward with respect to path F.

As seen in FIGURE 1, the jet stream leaving nozzle 43 flows in the direction of arrow J and the rotation of gyro wheel 11 is in the direction indicated by arrow R. Thus, at the X axis jet stream J is moving in the same direction as the peripheral edge 34 of gyro wheel 11. With gyro wheel 11 spining in its null position, peripheral edge 34 just grazes the surface of jet J. It appears that the boundary layer drag effect of wheel edge 34 causes a boundary layer of fluid indicated by arrows B to mix with jet stream J. With gyro wheel 11 in its null position boundary layer B is centered with respect to line F so that jet stream J remains centered on line F for its entire journey across open region 45 and equal volumes of fluid will enter diffusers 44, 45. This is schematically illustrated in FIGURE 7.

When gyro wheel 11 is tilted about the X-axis so that boundary layer B moves across line F from below to above, boundary layer B deflects jet stream J in a direction which tends to make the velocity vector of jet stream J lie in the plane of wheel 11. This deflects jet stream J toward upper diffusers 45 so that flow through diffusers 45 will increase while the flow through lower diffuser 44 will decrease. This is schematically illustrated in FIGURE 8. The schematic of FIGURE 9 shows the converse. That is, when gyro wheel 11 is tilted about the X-axis to a position where boundary layer B moves across line F from above to below, jet stream J is deflected toward lower diffusers 44 and away from upper diffusers 45.

It has been found that if the angle of rotation of wheel 11 about the X axis is kept relatively small the relationship between the differential flow rates through diffusers 44, 45 and the angle of deflection is linear.

Thus, it is seen that the instant invention provides a novel construction for a pneumatic attitude sensor in which there is no need to convert electrical signals to pressure heads in order to obtain a readout. It should now be clear to those skilled in the art that in addition to a spinning gyro wheel, various other mechanisms may be utilized to deflect the jet stream as it moves between the nozzle and knife edge in order to obtain an accurate indication of attitude.

Although there has been described a preferred embodiment of this novel invention, many variations and modifications will now be apparent to those skilled in the art. Therefore, this invention is to be limited, not by the specific disclosure herein, but only by the appending claims.

The embodiments of the invention in which an exclusive privilege or property is claimed are defined as follows.

1. In a sensing device of the class described having a gyro wheel, a frame, and means for rotating said wheel relative to said frame about a spin axis extending through the center of said wheel and perpendicular to the plane thereof, the improvement comprising a fluid angle transducer for measuring relative movement between said wheel and said frame from a null position about a first axis perpendicular to said spin axis and extending therethrough; said transducer including a jet forming nozzle, diffusing means, and an open region between said nozzle and said diffusing means; said nozzle constructed to emit a free jet into said open region and direct said jet forward along a null path toward said diffusing means; said wheel positioned with a portion of its peripheral edge on said first axis extending into said open region and grazing said jet; said jet being centered on said null path upon reaching said diffusing means as long as said wheel remains in said null position; said wheel upon moving from said null position causing said jet to be deflected so that upon reaching said diffusing means said jet is off center with respect to said null path; and readout means connected to said diffusing means for producing a signal indicating movement of said wheel from said null position about said first axis.

2. A sensing device as set forth in claim 1 in which rotation of said wheel produces movement of a boundary fluid layer positioned adjacent the peripheral edge of said wheel; said layer and said jet moving generally in the same direction at said first axis when said wheel is in said null position.

3. A sensing device as set forth in claim 1 in which there is another fluid angle transducer for measuring relative movement between said wheel and said frame from said null position about a second axis perpendicular to both said spin axis and said first axis; said another transducer being of substantially the same construction as the fluid angle transducer described in claim 1; said another transducer positioned with another portion of the wheel peripheral edge on said second axis extending into the open region of said another transducer and grazing the jet of said another transducer.

4. A sensing device as set forth in claim 3 in which rotation of said wheel produces movement of a boundary fluid layer positioned adjacent the peripheral edge of said wheel; said layer and the jet of the first recited transducer moving generally in the same direction at said first axis when said wheel is in said null position; said layer and the jet of said another transducer moving generally in the same direction at said second axis when said wheel is in said null position.

5. A sensing device as set forth in claim 1 in which the diffusing means includes a first and a second diffuser each having an entrance end adjacent said open region, said entrance ends disposed on opposite sides of said null path, said entrance ends operatively positioned and proportioned so that with said jet undeflected from said null path equal fluid pressures are present in said diffusers.

6. A sensing device as set forth in claim 5 in which said diffusing means includes a portion separating said diffusers; said portion terminating at said open region in a knife edge positioned on said null path.

7. A sensing device as set forth in claim 6 in which each of the diffusers comprises an elongated passage; said passages diverging from said knife edge forward.

8. A sensing device as set forth in claim 7 in which the readout means comprises a differential manometer.

9. A sensing device as set forth in claim 1 in which the peripheral edge of said wheel is spherical.

10. A sensing device as set forth in claim 9 in which there is another fluid angle transducer for measuring relative movement between said wheel and said frame from said null position about a second axis perpendicular to both said spin axis and said first axis; said another transducer being of substantially the same construction as the fluid angle transducer described in claim 1; said another transducer positioned with another portion of the wheel peripheral edge on said second axis extending into the open region of said another transducer and grazing the jet of said another transducer.

11. A sensing device as set forth in claim 10 in which rotation of said wheel produces movement of a boundary fluid layer positioned adjacent the peripheral edge of said wheel; said layer and the jet of the first recited transducer moving generally in the same direction at said first axis when said wheel is in said null position; said layer and the jet of said another transducer moving generally in the same direction at said axis when said wheel is in said null position.

12. In a sensing device of the class described having a gyro wheel, a frame, and means for rotating said wheel relative to said frame about a spin axis extending through the center of said wheel and perpendicular to the plane thereof, the improvement comprising a fluid angle transducer for measuring relative movement between said wheel and said frame from a null position about a first axis perpendicular to said spin axis and extending therethrough; said transducer including a jet forming nozzle, diffusing means, and an open region between said nozzle and said diffuser means; said nozzle constructed to emit a free jet into said open region and direct said jet forward along a null path toward said diffusing means; said transducer including a wall having one side thereof confronting said open region; said wall having its other side formed with a depression therein; aperture means in said wall connecting said open region with said depression; said wheel positioned with a portion of its peripheral edge on said first axis extending into said depression; said jet being centered on said null path upon reaching said diffusing means as long as said wheel remains in said null position; said wheel upon moving from said null position causing said jet to be deflected so that upon reaching said diffusing means said jet is off center with respect to said null path; and readout means connected to said diffusing means for producing a signal indicating movement of said wheel from said null position about said first axis.

13. A sensing device as set forth in claim 12 in which the peripheral edge is spherical and the depression includes a spherical surface confronting said peripheral edge.

14. A sensing device as set forth in claim 13 in which rotation of said wheel produces movement of a boundary fluid layer positioned adjacent the peripheral edge of said wheel; said layer and said jet moving generally in the same direction at said first axis when said wheel is in said null position.

15. A sensing device as set forth in claim 14 in which the diffusing means includes a first and a second diffuser each having an entrance end adjacent said open region, said entrance ends disposed on opposite sides of said null path, said entrance ends operatively positioned and proportioned so that with said jet undeflected from said null path equal fluid pressures are present in said diffusers.

16. A sensing device as set forth in claim 15 in which said diffusing means includes a portion separating said diffusers; said portion terminating at said open region in a knife edge positioned on said null path.

17. A sensing device as set forth in claim 16 in which each of the diffusers comprises an elongated passage; said passages diverging from said knife edge forward.

18. In a sensing device of the class described having a frame, first means movably mounted to said frame, and means for stabilizing said first means against tilting with respect to a reference axis while said frame is tiltable about a measuring axis perpendicular to said reference axis and extending therethrough, the improvement comprising a fluid angle transducer for measuring movement of said frame about said measuring axis from a null position relative to said first means; said transducer including a jet forming nozzle fixed relative to said frame, diffusing means, and an open region between said nozzle and said diffusing means; said nozzle constructed to emit a free jet into said open region and direct said jet forward along a null path toward said diffusing means; said first means positioned with a portion thereof extending into said open region and engaging said jet at least when said frame is in said null position; said jet being centered on said null path upon reaching said diffusing means as long as said frame remains in said null position; said frame upon moving from said null position causing said jet to be deflected by said portion of said first means so that upon reaching said diffusing means said jet is off center with respect to said null path; and readout means connected to said diffusing means for producing a signal indicating movement of said wheel from said null position about said first axis.

19. A sensing device as set forth in claim 18 in which the null path is perpendicular to the measuring axis.

20. A sensing device as set forth in claim 18 in which the diffusing means includes a first and a second diffuser each having an entrance end adjacent said open region, said entrance ends disposed on opposite sides of said null path, said entrance ends operatively positioned and proportioned so that with said jet undeflected from said null path equal fluid pressures are present in said diffusers.

References Cited by the Examiner

UNITED STATES PATENTS 3,165,282  1/1956  Noyes _____ 33—204 X 3,261,213  7/1966  Zeldmen at al. _____ 74—5.7

FOREIGN PATENTS 126,451  12/1918  Great Britain.

LEONARD FORMAN, *Primary Examiner.*

J. M. FREED, *Assistant Examiner.*